United States Patent [19]

Sprecher et al.

[11] Patent Number: 5,285,494
[45] Date of Patent: Feb. 8, 1994

[54] NETWORK MANAGEMENT SYSTEM

[75] Inventors: Jerry W. Sprecher; Donald J. Winters, Jr., both of Danville; Amirali S. Rajwany; Michael W. Dodson, both of Walnut Creek; Gene R. Penning, Antioch; Darryl F. Harrington, Pittsburg; Simon Chou, San Ramon, all of Calif.

[73] Assignee: PacTel Corporation, Walnut Creek, Calif.

[21] Appl. No.: 922,856

[22] Filed: Jul. 31, 1992

[51] Int. Cl.5 .................. H04M 11/00; H04M 15/00
[52] U.S. Cl. ........................................ 379/59; 379/60; 379/90; 379/111; 379/112; 379/114; 379/115
[58] Field of Search ...................... 379/59, 60, 63, 90, 379/111, 112, 114, 115, 118

[56] References Cited

U.S. PATENT DOCUMENTS

| | | | |
|---|---|---|---|
| 3,411,140 | 11/1968 | Halina et al. | 379/113 |
| 3,980,839 | 9/1976 | Hutcheson | 379/15 |
| 4,326,264 | 4/1982 | Cohen et al. | 395/295 |
| 4,447,872 | 5/1984 | Nothaft | 379/46 |
| 4,932,022 | 6/1990 | Keeney et al. | 379/165 |
| 4,972,457 | 11/1990 | O'Sullivan | 379/63 |
| 5,095,500 | 3/1992 | Tayloe et al. | 379/59 |
| 5,127,041 | 6/1992 | O'Sullivan | 379/59 |
| 5,128,981 | 7/1992 | Tsukamoto et al. | 379/60 |
| 5,164,982 | 11/1992 | Davis | 379/91 |

OTHER PUBLICATIONS

*NetExpert* TM User Manual Ver. 2.2, Nov. 15, 1991.

Primary Examiner—Curtis Kuntz
Assistant Examiner—Vijay Shankar
Attorney, Agent, or Firm—Merchant, Gould, Smith, Edell, Welter & Schmidt

[57] ABSTRACT

A system and method for network support that addresses the needs of a cellular phone system which handles large volumes of information. The invention comprises a complex computer network for performing various tasks including data collection and processing, equipment inventory management, customer service, tactical surveillance, trend forecasting, modeling and other interrelated processes. The system incorporates state-of-the-art computer hardware and software into an engineering platform for providing a modular base to accommodate multiple applications as well as to ease integration of future applications.

20 Claims, 17 Drawing Sheets

NETWORK MANAGEMENT SYSTEM

BACKGROUND OF THE INVENTION

1. Field of the Invention

This invention relates generally to information overload problems in a network, and in particular, to managing and integrating data from telephone switches, cellular phone sites and other related elements, which in the aggregate, provide cellular phone service.

2. Background of the Invention

Management of telephone switches, cellular transmission sites, and other related elements, which collectively provide cellular communication services, is very complex. The complexity is exacerbated by the myriad of network elements which generate data and by the sheer volume of the data. Information overload is an appropriate term to describe this central problem. Up until now, systems and methods in communication services have dealt with information overload by parsing out the data to multiple task handlers and manually integrating the results to achieve management and integration of the equipment and services. High integration and correlation of data from the various task handlers was impracticable or at the very least cumbersome.

SUMMARY OF THE INVENTION

The present invention addresses the needs of a cellular phone network which handles large volumes of information using a two-pronged information-oriented strategy. The invention comprises a complex computer network and related equipment for performing various tasks including data collection and processing, equipment inventory management, customer service, tactical surveillance and trend forecasting of the communication network, modeling and other interrelated processes. The invention incorporates state-of-the-art computer hardware and software into an engineering platform for providing a modular base to accommodate multiple tasks as well as ease integration of future tasks.

The hardware includes a high speed network of computer workstations for accessing vast amounts of data generated by the numerous elements in a wireless communication network, including but not limited to, telephone switches, cellular transmission sites, and associated microwave equipment. Individual user workstations operate in a window based environment for providing multi-tasking. The software includes a powerful on-line relational data base essential for manipulation and high integration of the vast amounts of data.

Real-time and historical data is utilized for dynamic as well as trend analysis. Real-time data originating from the various network elements flows into a master server located on the computer network. The data originating from the master server is then parsed by a data interface module (parser) and reformatted by a data format module (populator) for input into a relational data base running on a slave server also connected to the network. A graphical user interface is provided to the relational database for facilitating ease in report generation and system management. The relational database provides access to any of a plurality of task handlers. The task handlers include, inter alia, a tactical surveillance module, a network management system module and a prediction and simulation module.

BRIEF DESCRIPTION OF THE DRAWINGS

Referring now to the drawings in which like reference numbers represent corresponding parts throughout.

DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

A portion of the disclosure in this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

Figure 1:
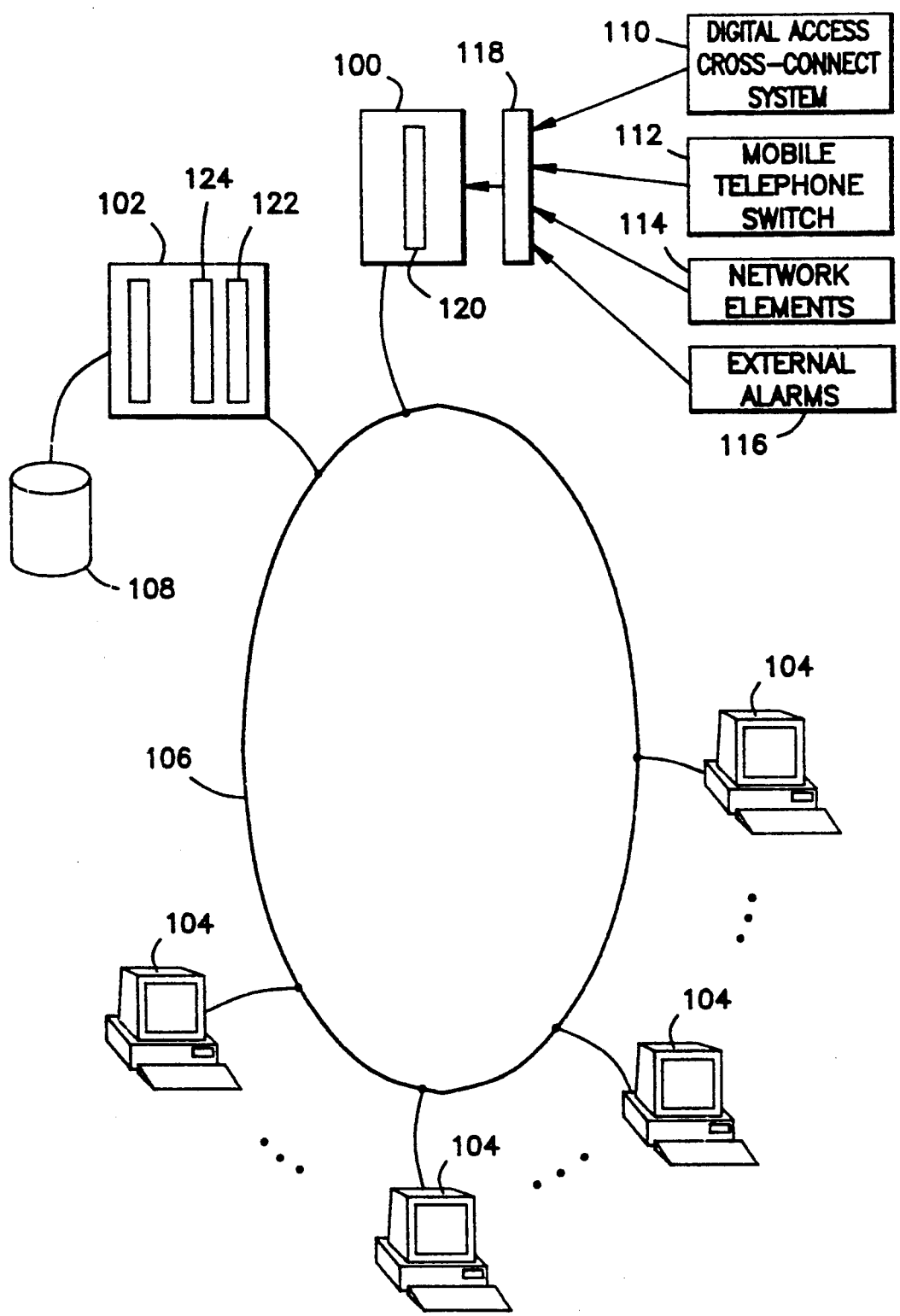
FIG. 1 is a diagram of the hardware architecture in the preferred embodiment, in accordance with the principals of the present invention for a Network Support System.

Reference is now made to FIG. 1 which depicts the hardware architecture of the preferred embodiment in accordance with the principles of the present invention for a Network Support System (hereinafter referred to as NSS). The term "server" is used herein to denote a computer workstation configured to provide a specified service on a network 106.

The decentralized hardware architecture comprises a master server 100, a slave server 102 and database 108, a plurality of user workstations 104, all coupled together through the network 106. In the preferred embodiment, the network 106 is depicted as having a ring topology. Those skilled in the art will be able to bring to mind other known network topologies such as, but not limited to, a star or a bus configuration.

Real-time information flows into the master server 100 through a switch interface 118 from a digital access cross-connect system 110, a mobile telephone switch (MTS) 112, external alarms 116 and other network elements 114. The elements provide, inter alia, billing, traffic alarm, administration, and maintenance information. The master server 100 collects and filters the incoming real-time data, prepares updates for the relational database 108, and provides dial-up access for remote access to the network 106 via a modem 120.

The slave server 102 supplies the relational database 108 with data received from the master server 100, it processes database access requests from any of the plurality of user workstations 104, it stores historical files and it provides work-space for recovery and analysis of such files, and it may serve as a user workstation during non-peak usage periods.

The data originating from the master server 100 is parsed by a data interface module (parser) 122 on the slave server 102 and reformatted by a data format module (populator) 124 on the slave server 102 for input into the relational data base 108.

Each user on the plurality of workstations 104 has restricted access to the relational database 108 for the purpose of manipulating the data and generating reports.

Figure 2:
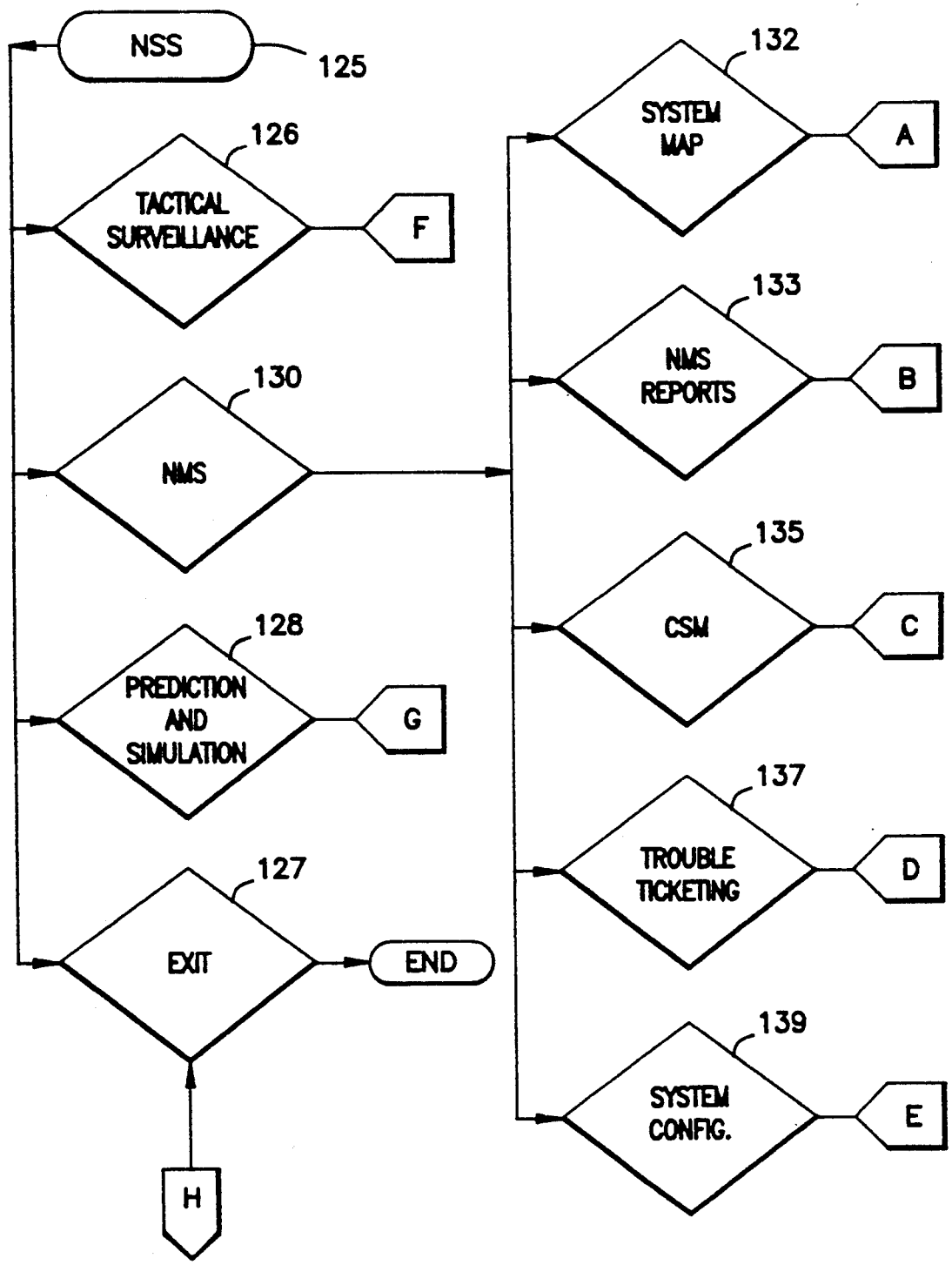
FIG. 2 is a detailed flow diagram of various task handlers available under the Network Support System in accordance with the principles of the present invention.

Reference is now made to FIG. 2 which depicts a flow diagram of the various task handlers available under the NSS user interface 125 in accordance with the principles of the present invention. The NSS user interface 125 provides, inter alia, a tactical surveillance module 126, a prediction and simulation module 128, a network management system (NMS) module 130, and a exit module 127, all modules being selectable from a main menu on the NSS user interface 125. The hierarchy of the modules and options therein are depicted more fully in FIGS. 3-15. Each of the NSS modules are described in more detail herein with reference to these figures.

TACTICAL SURVEILLANCE MODULE

The tactical surveillance module 126 of the NSS interface 125 enables the user to evaluate alarm data from network elements affected by a natural or man-made disaster such as, but not limited to, cell site outages and unusual shifts in traffic patterns. It enables a privileged user to then make dynamic network adjustments in response thereto.

Figure 3:
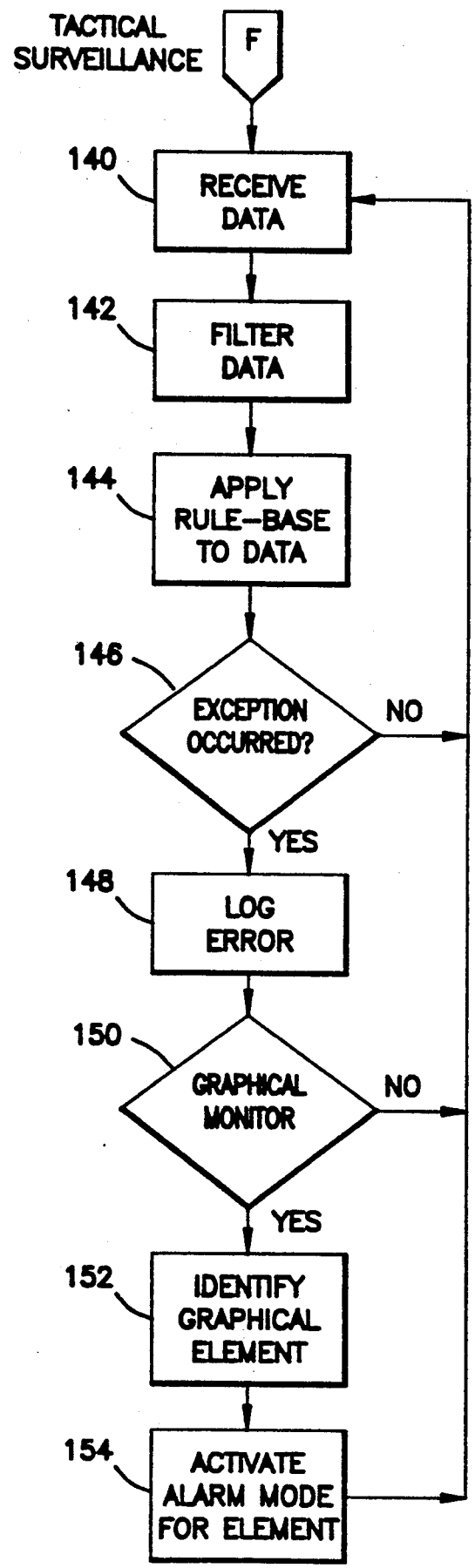
FIG. 3 is a detailed flow diagram of the tactical surveillance module in FIG. 2.

Reference is now made to FIG. 3 which describes in detailed flow diagram form, the tactical surveillance module 126 of FIG. 2. At step 140 data from database 108 is received and filtered at step 142. A rule-base is applied to the data at step 144. The rule-base for the tactical surveillance module 126 may be, but is not be limited to, the Netexpert™ package available from Objective Systems Integrators of Folsom California. The Netexpert™ package and its associated documentation are herein incorporated by reference for purposes of illustration and not limitation. Those of ordinary skill in the art will be able to bring to mind other expedients for the rule-base package without departing from the spirit of the present invention.

At step 146, it is determined according to the rule-base whether an exception occurred to the rule-base. In the event an exception occurs, the error is logged at step 148. At step 150 it is determined whether the graphical monitor is activated. The appropriate graphical element is identified at step 152 if the graphical monitor is activated. At step 154 an alarm mode is activated for the identified element.

Figure 4:
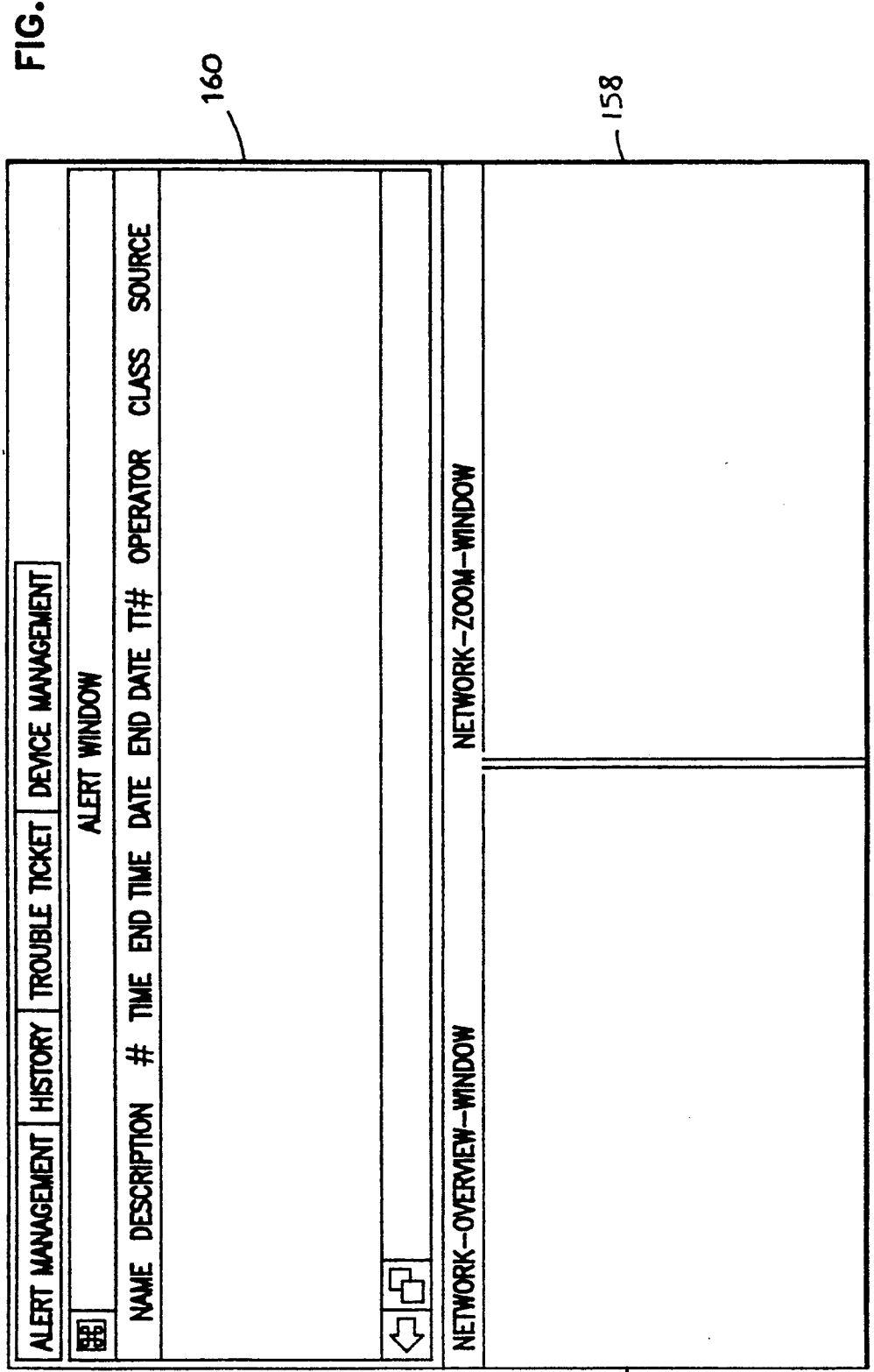
FIG. 4 is a tripartite screen in preferred embodiment form, illustrating the output of the tactical surveillance module.
Figure 4A:
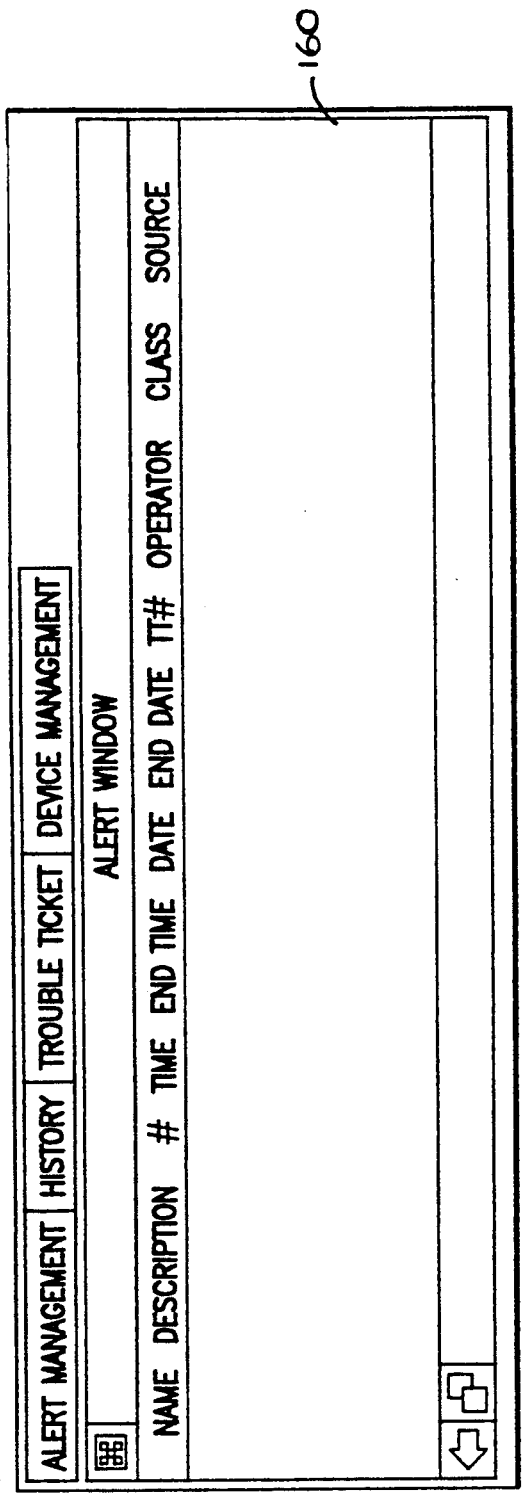
Figure 4B:
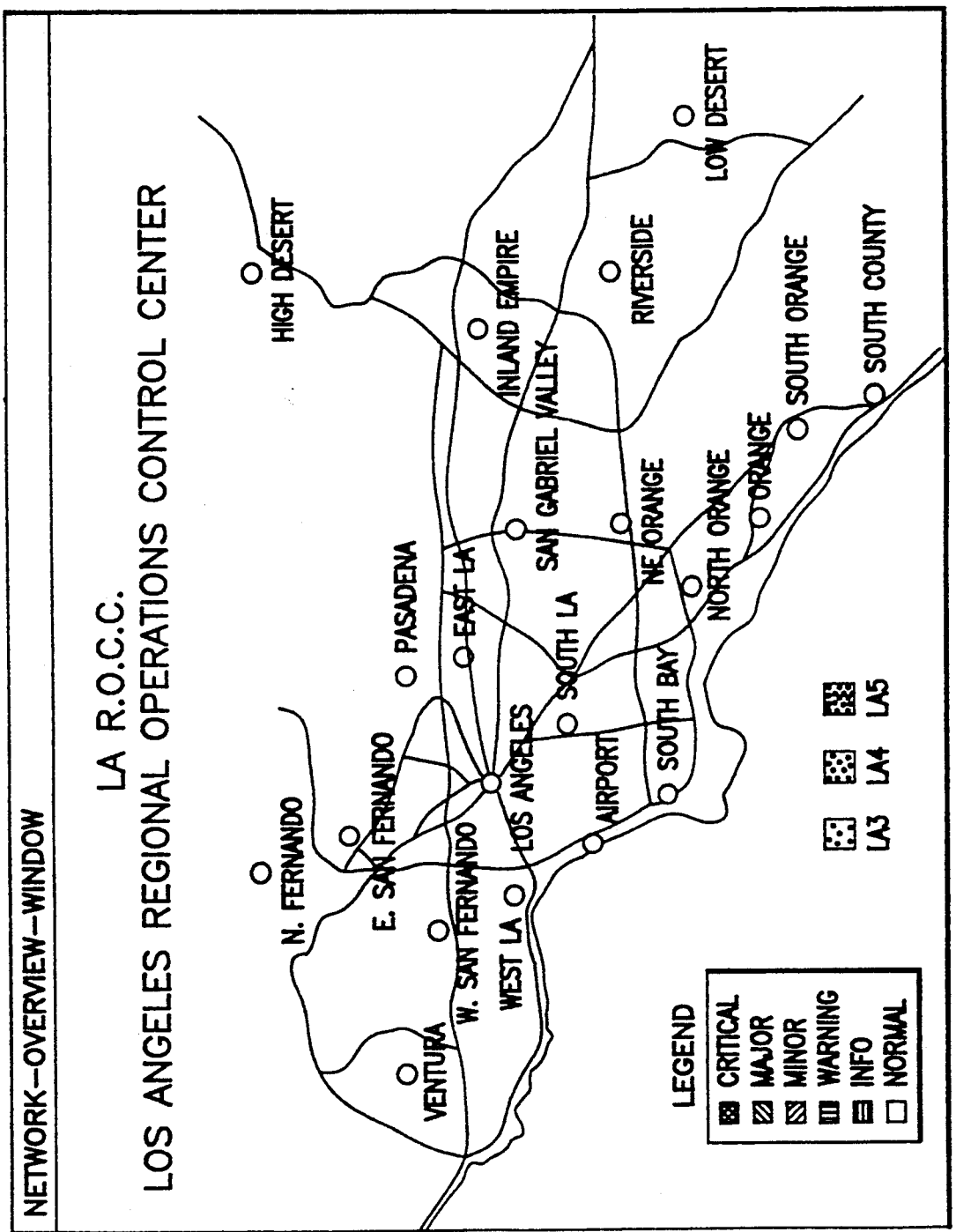
Figure 4C:
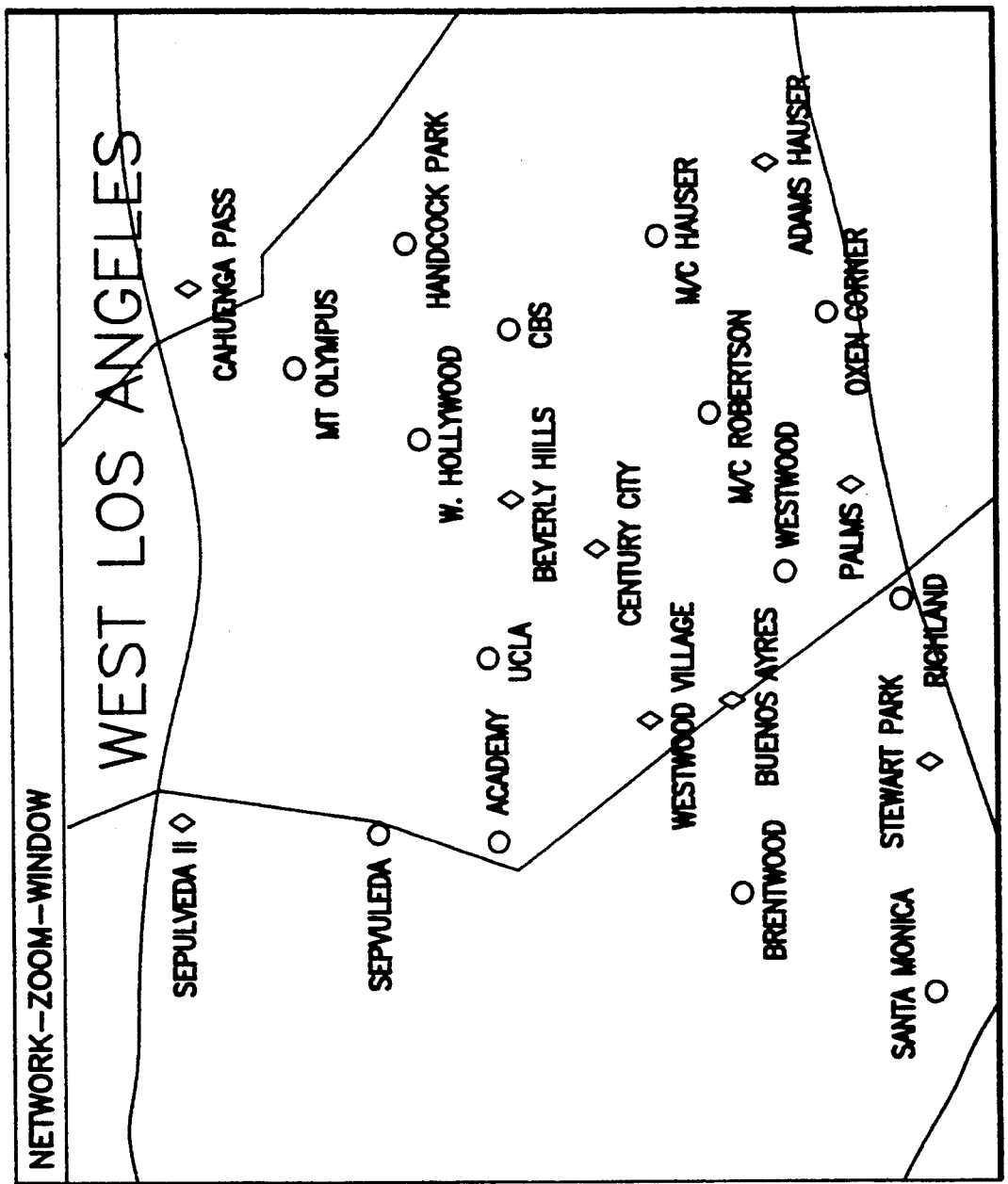

Reference is now made to FIG. 4 which depicts in the preferred embodiment form, a tripartite screen illustrating the output of the tactical surveillance module 126. An overview graphical monitor 156 is depicted in the bottom left-hand corner of the screen (FIG. 4B) while a detailed graphical monitor 158 (FIG. 4C) is depicted in the bottom right-hand corner of the screen. A legend 157, here depicted in the left-hand bottom of the screen (FIG. 4B), color codes the graphical monitors 156 and 158. The colors indicate the criticality of an alarm condition ranging from a normal condition to a critical alarm. A textual error log 160 (FIG. 4A) is depicted along the top of the screen. The textual error log 160 includes but is not limited to such information as the name of the alarm site, the description of the alarm, the time and the day of the occurrence of the alarm, the time and the day that the alarm was cleared, and the operator who resolved the alarm condition. It is to be understood that the screen depicted in FIG. 4 is illustrative and not exhaustive.

PREDICTION/SIMULATION MODULE

The prediction and simulation module 128 predicts and simulates future cellular markets and provides a database 248 (FIG. 11) for other modules operating within the system. It employs market terrain and cell/sector data to generate models of optimum conditions for potential market areas. A prediction and simulation module 128 such as the one described in co-pending U.S. patent application Ser. No. 07/922,822, assigned to the assignee of the present application, is herein incorporated by reference for purposes of illustration and not limitation.

Figure 16:
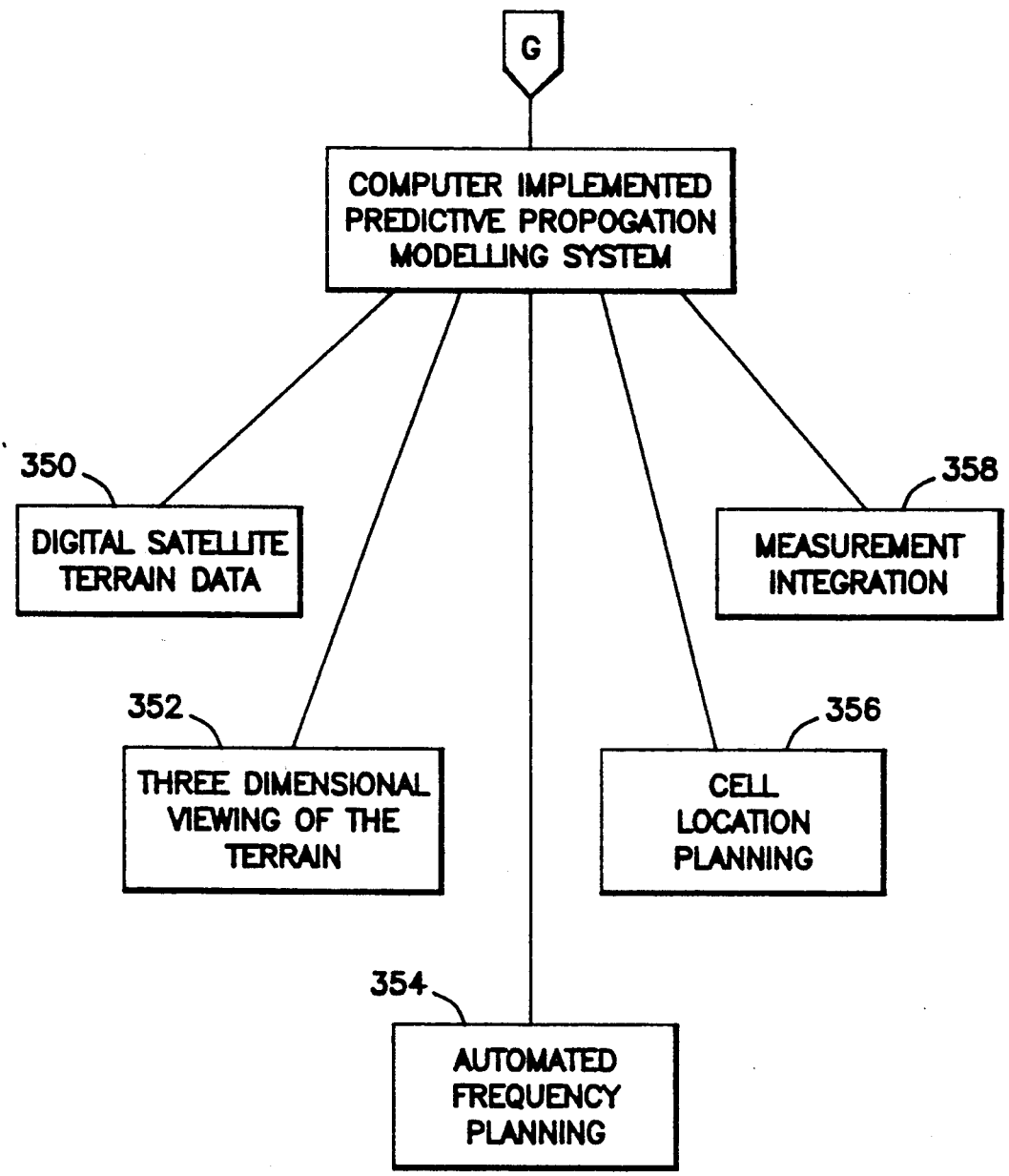
FIG. 16 is a detailed flow diagram of the prediction and simulation module in FIG. 2.

Reference is now made to FIG. 16 which describes in flow diagram form, the prediction and simulation module 128 of FIG. 2. The prediction and simulation module 128 receives digital satellite terrain data at step 350. Three dimensional viewing of the terrain is provided at step 352. Automated frequency planning is provided at step 354. Cell location planning is provided at step 356 while measurement integration is provided at step 358. The aforementioned flow diagram in FIG. 16 is but one example of the prediction and simulation module 128. Those of ordinary skilled in the art will be able to bring to mind other expedients for the prediction and simulation module 128 without departing from the scope the present invention.

NETWORK MANAGEMENT SYSTEM MODULE

The network management system module 130 (hereinafter referred to as NMS) monitors a cellular phone system and generates operational, performance, and maintenance system reports. The NMS module 130 creates trend forecasts and provides cell site modeling of existing cellular phone markets. Under NMS 130, the user has access to system map 132, NMS Reports 133, cell site modeling 135, trouble ticketing 137, and system configuration 139 modules. Each of these modules are described in more detail hereinbelow.

System Configuration

The system configuration module 139 permits the user to configure the reporting format for all standard reports generated under the NMS Reports option 133 described hereinafter in more detail.

Figure 5:
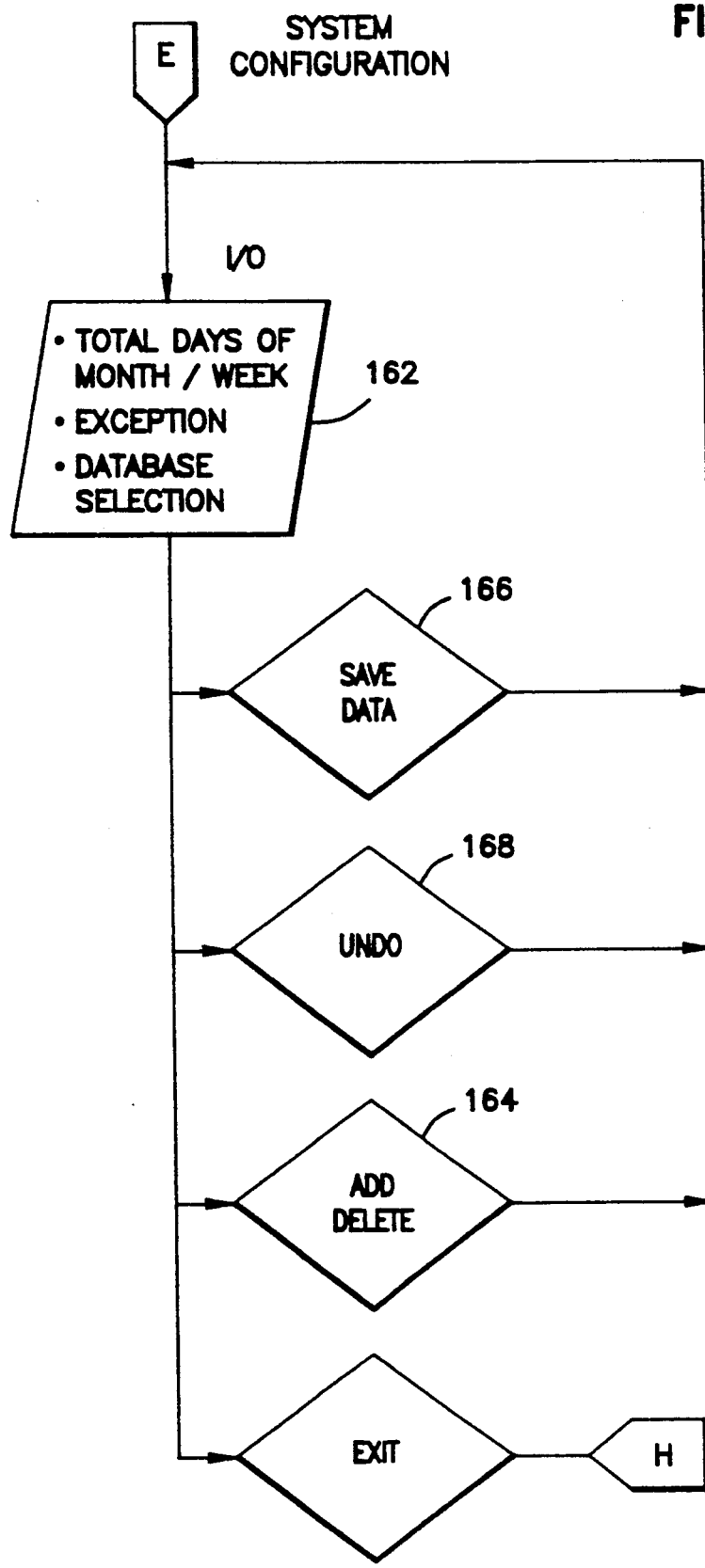
FIG. 5 is a detailed flow diagram of the system configuration module in FIG. 2.

Reference is now made to FIG. 5 which describes in detailed flow diagram form, the system configuration module 139 of FIG. 2. At step 162, the user is queried to input the total days of the month and the week from which data is to be provided in generating the reports under the NMS Reports option 133. Moreover at step 162, there is the capability for the user to input exceptions (e.g. holidays) that are not to be included in routine reporting. An add or delete utility 164 is provided to enable the user to add or delete any date entered. A save data utility 166 is provided to enable the user to save the changes to a system file. An undo utility 168 is also provided to enable the user to discard all changes since the last save under the save utility 166.

By way of example and not limitation, data entry fields and utilities are now described below as one possible embodiment for the system configuration module 139. Those skilled in the art will readily recognize other expedients for practicing the system configuration module 139 without departing from the spirit of the present invention.

A market name field may be provided to enable the user to enter the user's relevant market name. A database field may be provided to enable the user to choose the relevant database. A maximum auto-generation job field may be provided to enable the user to choose a number of reports to be process simultaneously. A busy hour field maybe provided to enable the user to choose to a busy hour or to default to a value set by a system administrator. A first day of the month field may be provided to enable the user to input a first working day of month while a last day of the month field would enable the user to input a last working day of month. A week days included in the weekly reports field may be provided to enable the user to toggle to and select between the days of the week to be included in each report. A date panel may be provided to enable the user to input the dates for holidays and special occasions which are to be exempt from reporting. An exception days list may be provided to list of all the exempt days. An exceptions are included/excluded utility may be provided to enable the user to include or exclude holidays and other special occasions from reports.

System Map

The system map module 132 is a graphical user interface for providing a detailed United States Geographical Survey (USGS) terrain map of a specific cellular market area. The system map is color coded by elevation and depicts area freeways and cell/sectors located within the user's specified cellular phone market.

Figure 6:
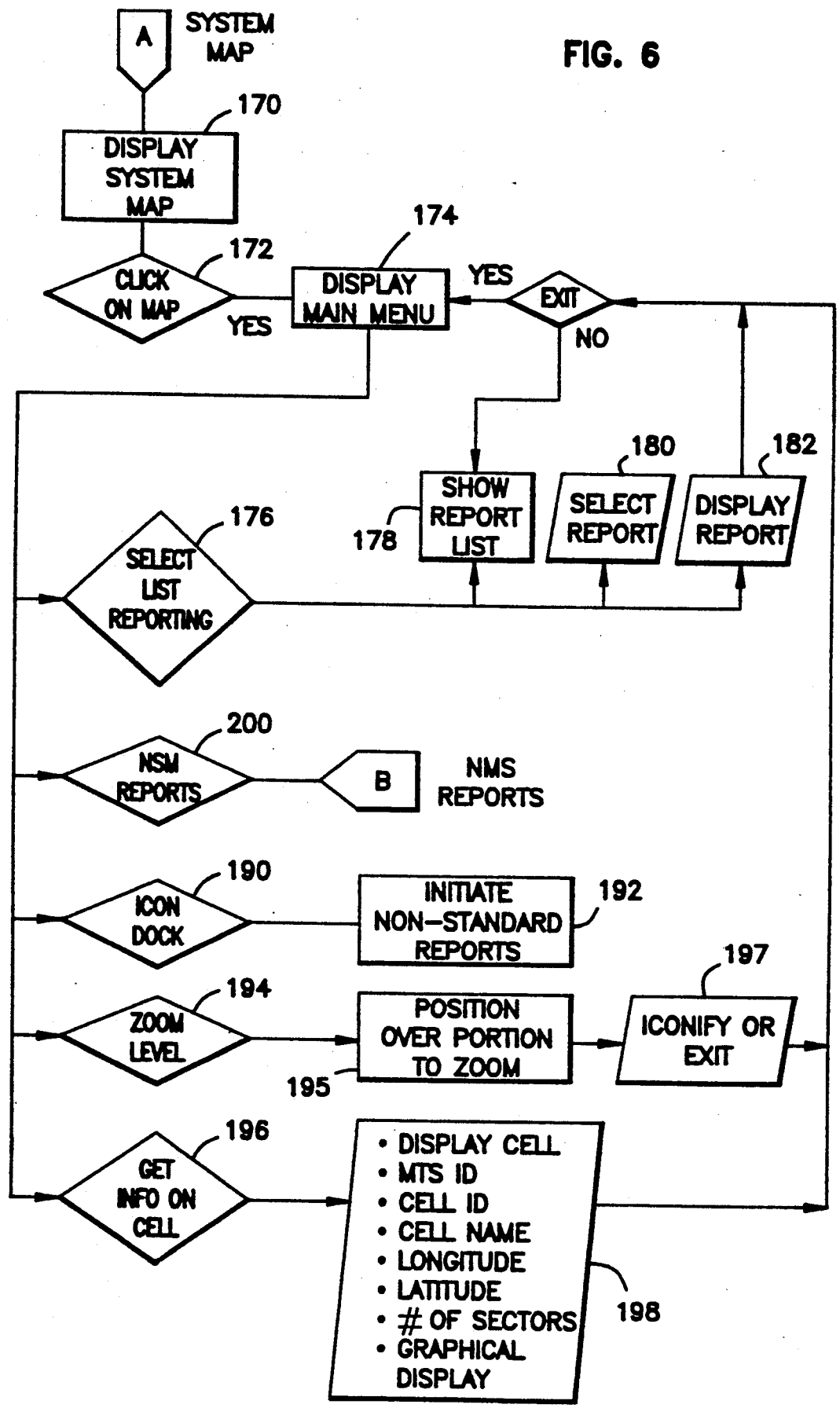
FIG. 6 is a detailed flow diagram of the system map module in FIG. 2.

Reference is now made to FIG. 6 which describes in detailed flow diagram form, the system map module 132 of FIG. 2. At step 170, a system map is displayed. At step 172, the user selects "clicks" anywhere on the system map to cause a menu to appear at step 174. Through the system map main menu, the user has access to the database 108 for generating network performance, maintenance, or customer service reports for the whole market or for a specific list of cell/sectors selected directly from the map. The user can utilize historical data for forecasting unusual traffic patterns providing the means for revising the dynamics of network routings.

Figure 7:
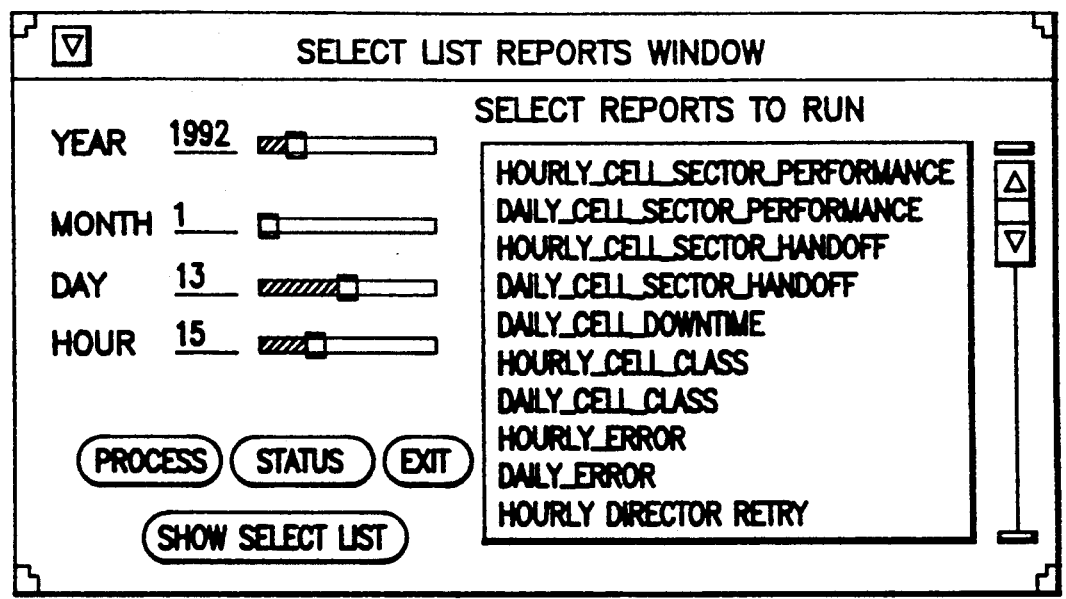
FIG. 7 is a select list reporting option window in accordance with the principals of the present invention.

At step 176, the select list reporting option brings up a window, such as but not limited to, the one depicted in FIG. 7. The window includes the options (FIG. 6) show report list 178, select a report 180, or display a report 180. The show report list step 178 displays a list of cell/sectors which have been selected by the user from the system map. The display a report step 182, pulls data from pre-existing reports which pertain to the cell/sectors selected by the user.

Following is a list of the different types of standard reports available when practicing the principles of the present invention.

Hourly: provides hourly information of network performance.

Daily: provides daily information of network performance.

Weekly: provides weekly information of network performance.

Monthly: provides monthly information of network performance.

Quick Stats: provides common and often used data in a short summary form. The following are four types of Quick Stat reports:
Pre-defined Busy Hour
All Day Report
RF Loss Summary
System Sort

Icon Dock

Selection of the Icon Dock at step 190 brings up an icon dock window (not shown). The user can initiate non-standard (Ad Hoc) reporting at step 192. Ad hoc reports are standard reports which have been edited or modified for non-standard use. The Ad hoc reports can only be saved to an "Ad Hoc" or personal directory associated with the user.

Zoom Level

The system map may become crowded and selecting a particular cell or sector may become difficult. To facilitate the selection process at step 194, an user specified zoom is provided which magnifies a select portion of the map at step 195. Additionally at step 197, multiple zoom windows may be opened and iconified for later or repeated use. To iconify a zoom window, the user selects in the title bar of the zoom window to be iconified. An icon for the zoom window appears at the bottom of the screen. To retrieve a zoom widow, the user selects over the appropriate icon and then selects "Open" to display the zoom window.

Get Info on Cell

Figure 8:
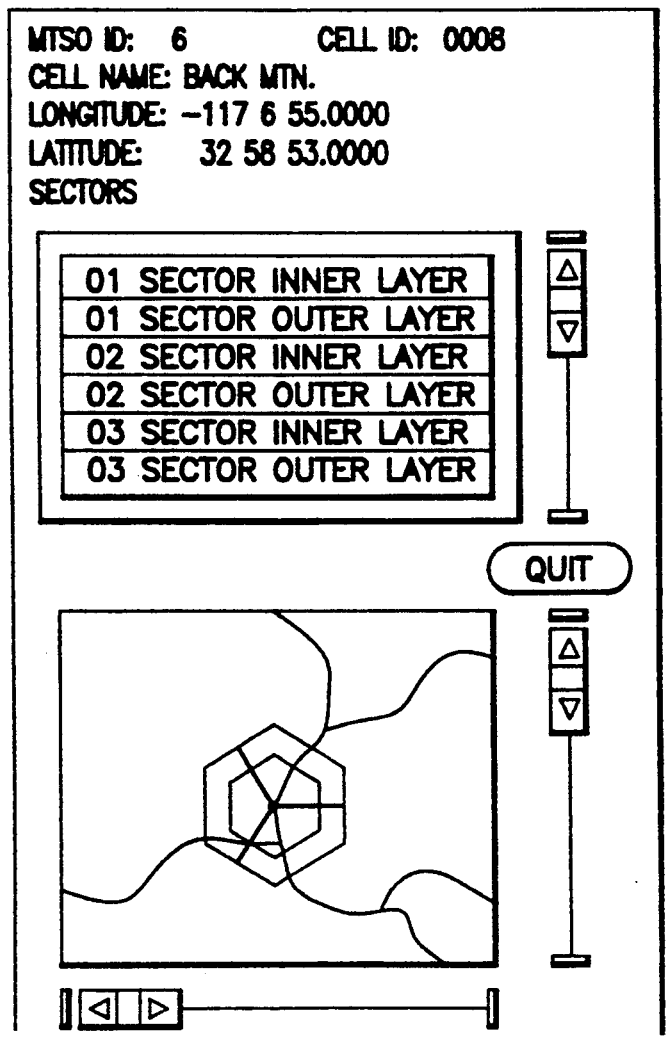
FIG. 8 is a cell INFO window in accordance with the principals of the present invention.

The get info on cell at step 196 displays statistics on a particular cell. At step 198, a cell INFO window supplies the mobile telephone switch office number, cell identification number, cell name, longitude and latitude of the cell, the number of sectors and their location within the cell, and a graphical display of the cell. By highlighting one of the sectors within a particular cell, a sector INFO window appears. FIG. 8 is an exemplary but not exclusive depiction of a cell INFO window in accordance with the principals of the present invention.

The sector INFO window (not shown) supplies the cell ID, the sector identification number, a spectrum list, arc of span in degrees, direction of the antenna in degrees, and the range of coverage.

NMS Reports

Figure 9:
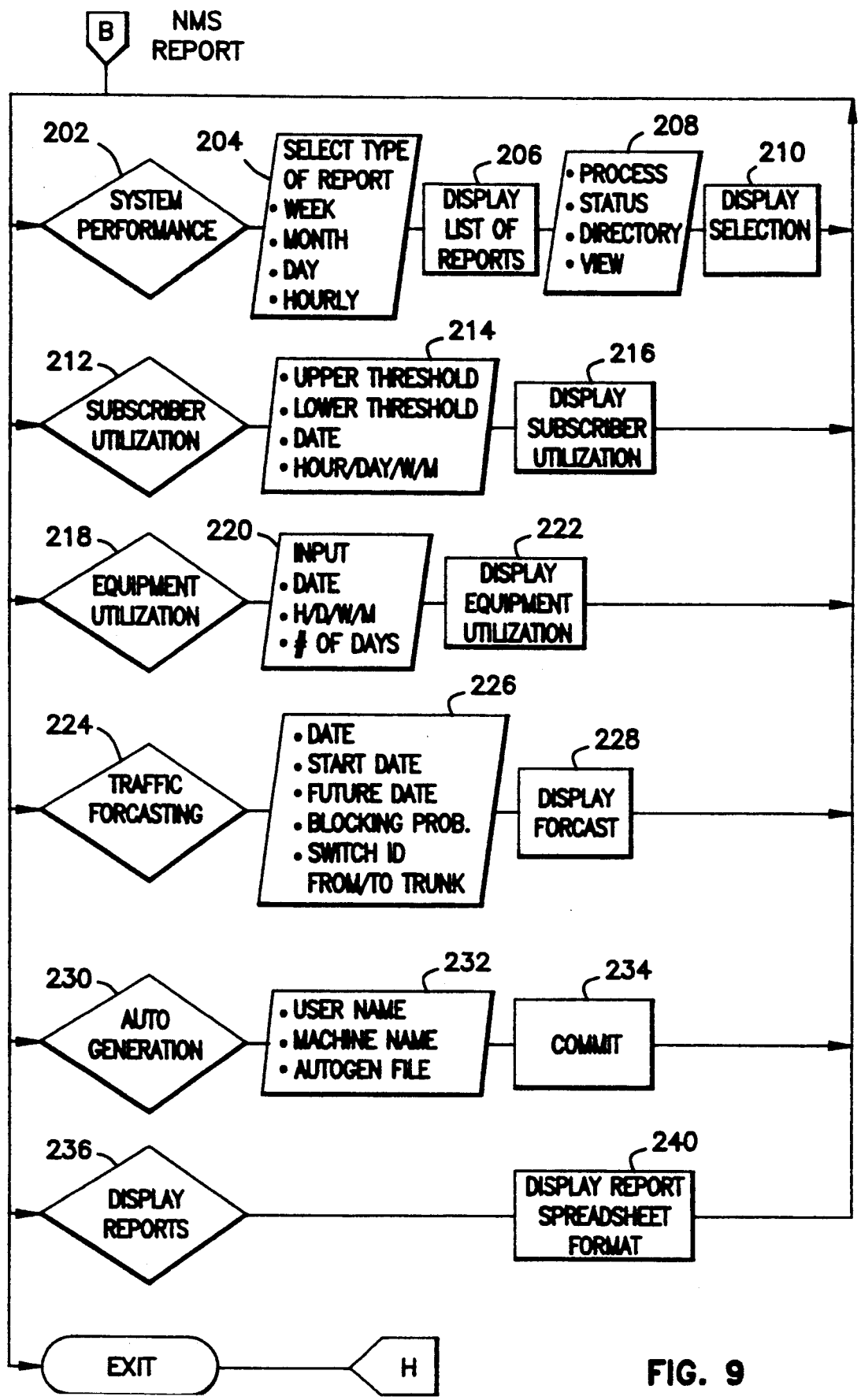
FIG. 9 is a detailed flow diagram of the NMS reports option in FIG. 2.
Figure 10:
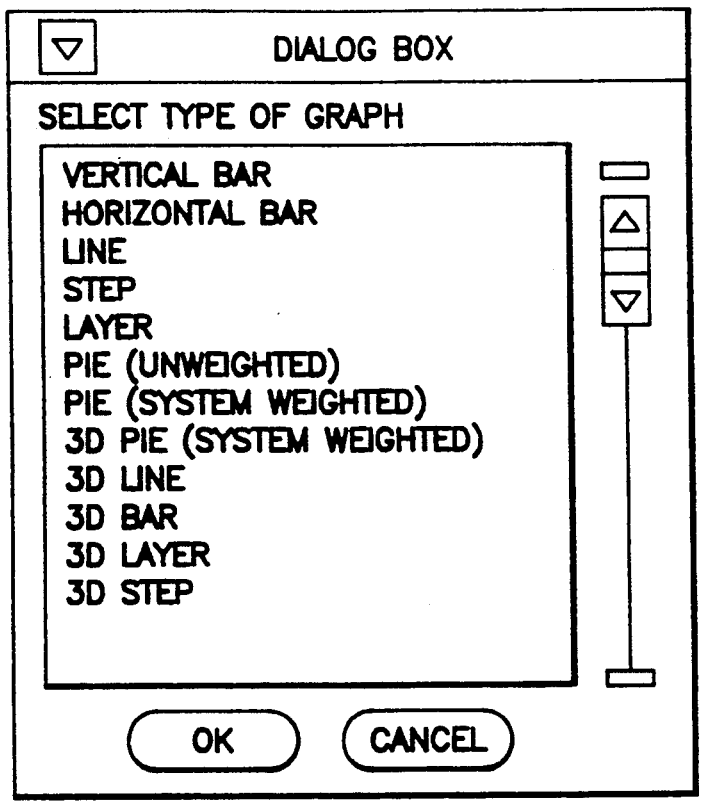
FIG. 10 is a dialog box window in accordance with the principals of the present invention.

The NMS reports option at step 200 as well as the NMS reports module 133 is best depicted in flow diagram form in FIG. 9 to which reference is now made.

The system performance option at steps 202-210 provides the hourly, daily, weekly and monthly system performance reports pertaining to the following parameters:
Lost Call Data
Blocked Call Data
Traffic/Usage Statistics
Out of Service Radio Identification
Cell/Sector/Channel Outage Identification
Hand-off and Directed Retry Statistics At step 204, a list of hourly, daily, weekly, or monthly reports are available when the preferred format is selected by the user. At step 206, a list of reports is displayed. At step 208, the user has the option to select process, status, directory or view. Selection of status displays a table (not shown) which supplies information regarding reports being processed. The table may include inter alia, a start time of initiation of processing, status for designating "in process" for reports currently being processed, "canceled" for reports canceled by the user, "failure" for reports that failed to process, "successful" for reports that have completed processing, and a report name for displaying the name of the report being processed.

The Directory option displays a directory of all reports that have already been generated. An enter template field is provided to permit the user to enter a specific "group" of reports to be displayed. Once a report has been successfully generated and displayed, the user can then select an output option such as graph, save, or print. If the graph option is selected, a dialog box window such as the one depicted in FIG. 10 pops up to query the user to select the style of graph.

The subscriber utilization option at step 212 generates subscriber utilization reports. At step 214, the user may enter an upper and lower threshold value. For example, if the user inputs 90% for the upper threshold, the System will report on all ESNs that failed greater than and equal to 10% of the time. If the user inputs 10% for the lower threshold, the System will report on all ESNs that failed greater than and equal to 10% of the time. At step 214, the user may input the minimum number of calls per ESN that will be processed in this report. For example, if the user inputs 20 the System will only source those ESNs that have attempted 20 calls which failed within the upper and lower thresholds established by the user. The user may also input the minimum call duration. At step 216, subscriber utilization reports in accordance with the aforementioned user selected criteria is displayed.

The network equipment utilization option at step 218 generates reports base on network equipment utilization parameters. At step 220, additional user input prior to processing is applied including the previous number of days to be sourced for data to generate the report. At step 222, network utilization in accordance with the user selected criteria is displayed.

The traffic forecasting and president's reports option at step 224 generates traffic forecasting and president's reports. Two types of traffic forecasting reports namely, trunk forecasting and cell/sector forecasting are available. Both types require additional user input prior to processing at step 226.

The following user selectable fields for trunk forecasting are provided by way of example and not limitation. A field of "historical data since" permits the user to input the starting date from which to initiate sourcing of historical data. A field of "forecasting for" permits the user to input a future date for which they wish to forecast. A field of "blocking Probability (%)" permits the user to input a theoretical percentage of the number of trunks that will be blocked at a given time. A field of "switch Id List" permits the user to input a select mobile telephone switch (MTS). A field of "from Trunk and to Trunk" permits the user to select a block of trunks. A field of "Trunks Displayed" provides the total number of trunk items listed. A field of "trunks selected" provides a total number of items that have been selected from the field of "Trunks Displayed" listing. A "redisplay trunks list" allows the user to change the display items from all items in the market to only those entered in the "from Trunk and to Trunk" field. A "select all" option allows the user to select all items from the listing.

User selection of the president reports provides monthly reports pertaining to topics such as operational issues, system performance, financial risks and weaknesses, network reports, the ten worst blocked cell/sectors, volume of lost calls, and the ten worst downtime cell/sectors.

At step 228, the traffic forecasting or president's reports is displayed.

The auto generation option at step 230 enables the user to specify when to run selected reports. At step 232, individual data entry fields are provided for user input for specialized information such as user and machine name. At step 234, the user may commit the entries made at step 232 to nonvolatile memory.

The display reports at step 236 displays the reporting categories possible under NMS Reports. A directory of reports provides the user with a listing of all reports that have already been generated. A date panel permits the user to input the year, month, day and hour for report coding. At step 240, the user may view the report in a spreadsheet format.

Cell Site Modeling

Cell Site Modeling (hereinafter referred to as CSM) combines data entry and a graphics interface to enable the user to create and modify cell sites. The user can access cell site modeling data sources through menus for generating model files. The cell site models can be utilized for normal NMS operations or for supporting other non-standard reporting functions and/or alarm monitoring functions. CSM operates in a window environment for providing simple data entry allowing the user to concurrently create or modify several cells and reference more than one mobile telephone switch (MTS) at a time.

A cellular market comprises one or more territories each of which is monitored by a MTS. Each MTS operates a number of cell sites and collects operational data as well as alarm data, such as from, but not limited to, environmental alarm systems on all the cell sites it controls. Each cell site can contain up to twelve sectors. Each cell/sector can be identified through statistical data records and is graphically represented on both the System Map (described above) and the CSM Map.

Cell Site Modeling is based on the concept of treating each cell or MTS as an "entity" possessing certain functional and graphical "properties". Any cell site or MTS can be created or modified if the appropriate data pertaining to these properties can be sourced and accessed.

Figure 11:
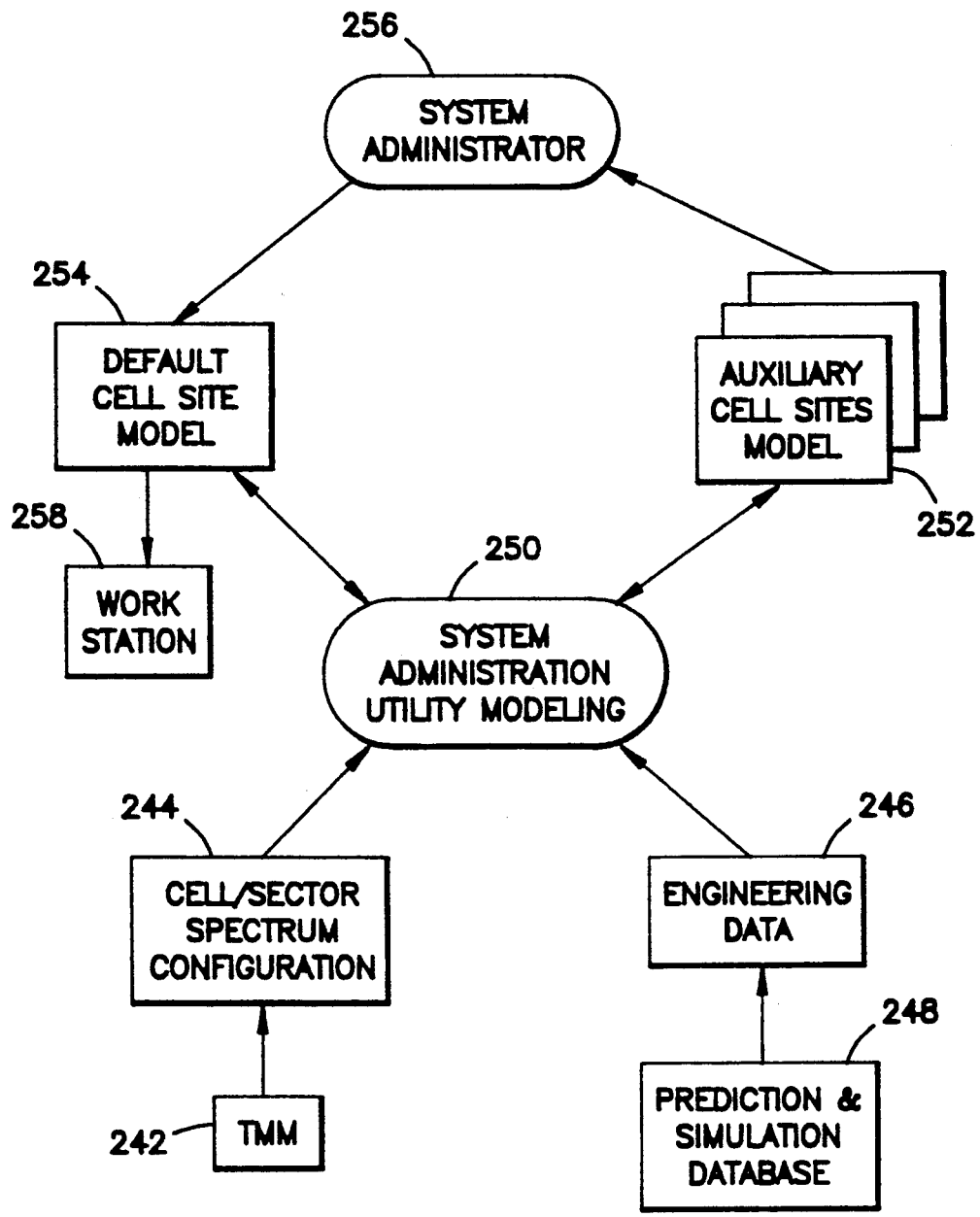
FIG. 11 is a block diagram for the Cell Site Modeling module in FIG. 2.

Reference is now made to FIG. 11 which depicts a block diagram for CSM in accordance with the principles of the present invention. Information contained in a traffic metering and measurement (TMM) database 242 provides data for an existing cell/sector spectrum configuration 244 for system administration utility modeling 250. Alternatively or conjunctively, engineering data 246 from the prediction and simulation database 248 supplies data for system administration utility modeling 250. Auxiliary cell site models 252 may also be supplied to and from the system administration utility modeling 250. The system administrator 256 receives a cell site model from the auxiliary cell site models 252 and supplies a default cell site model 254 for use by a user on workstation 258.

There are two types of CSM, namely, MTS and Cell Site Models. The two types of CSM provide the user the ability to create and manipulate various models of cell sites and switches and the interaction therebetween.

The MTS model contains switch data and a listing of all the cell sites controlled by a particular MTS.

The cell site model includes a data entry field for user input and information and a graphical view port employing a zoom effect for displaying a large scale map with the cell site of interest highlighted and positioned in the center of the port. The user can input data both from the data entry field and from the graphical view port. Each cell site model can create up to twelve subsection (sector) windows.

Figure 12:
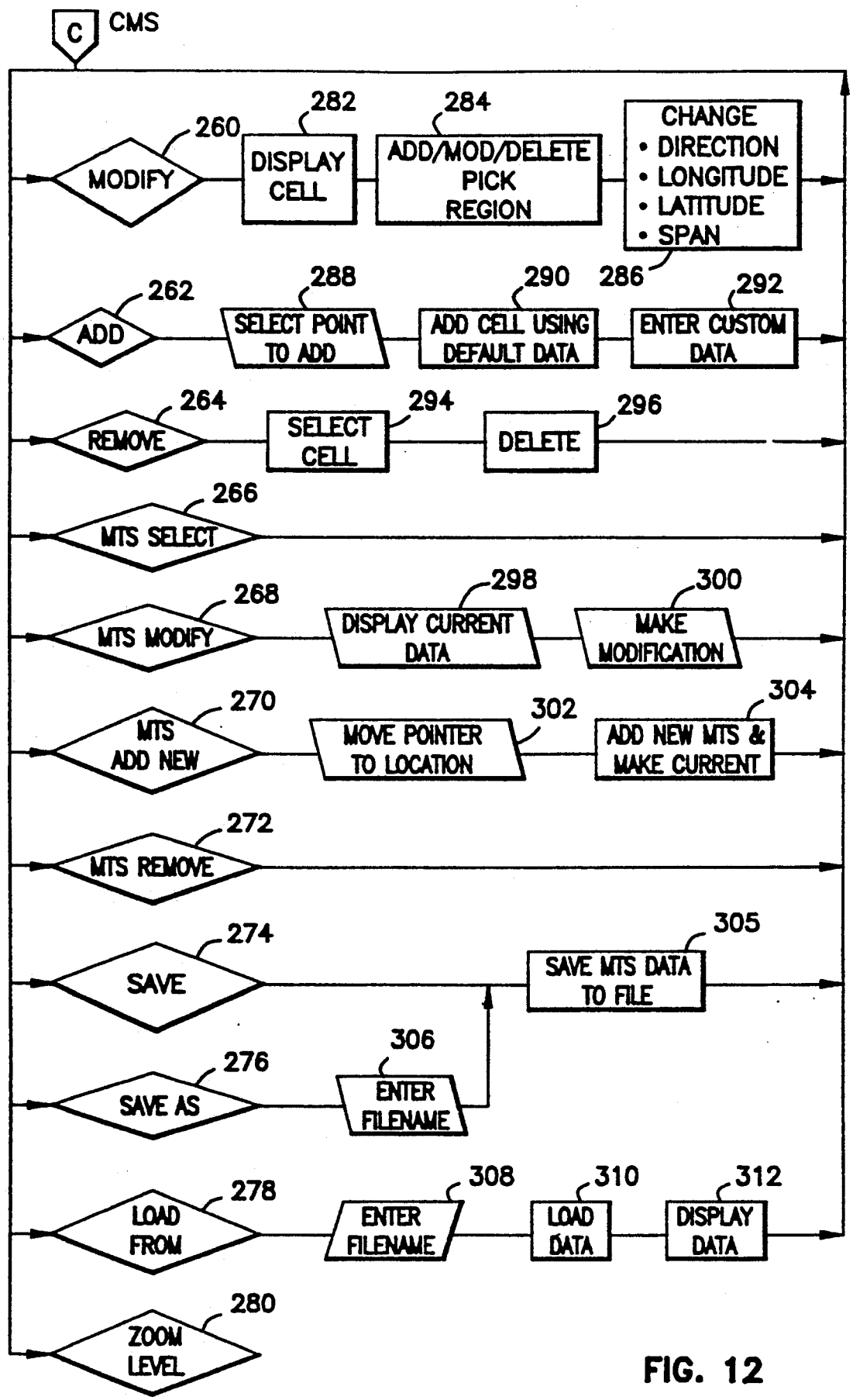
FIG. 12 is a detailed flow diagram of the Cell Site Modeling module in FIG. 2.

Reference is now made to FIG. 12 which depicts a detailed flow diagram of the CSM module 135 in FIG. 2. CSM offers a modeling menu for providing the steps of cell modify 260, cell add 262, cell remove 264, MTS select 266, MTS modify 268, MTS add new 270, MTS remove 272, save 274, save as 276, load from 278, and zoom level 280. Steps 260, 262, and 264 provide cell site manipulations while steps 266–272 provide MTS manipulations and steps 274–280 provide utility options. The steps are described in more detail herein below.

The Cell Modify step 260 is the most commonly performed operation. The user selects this option for the desired cell to be modified displaying its data entry fields and graphical view port at step 282.

Figure 13:
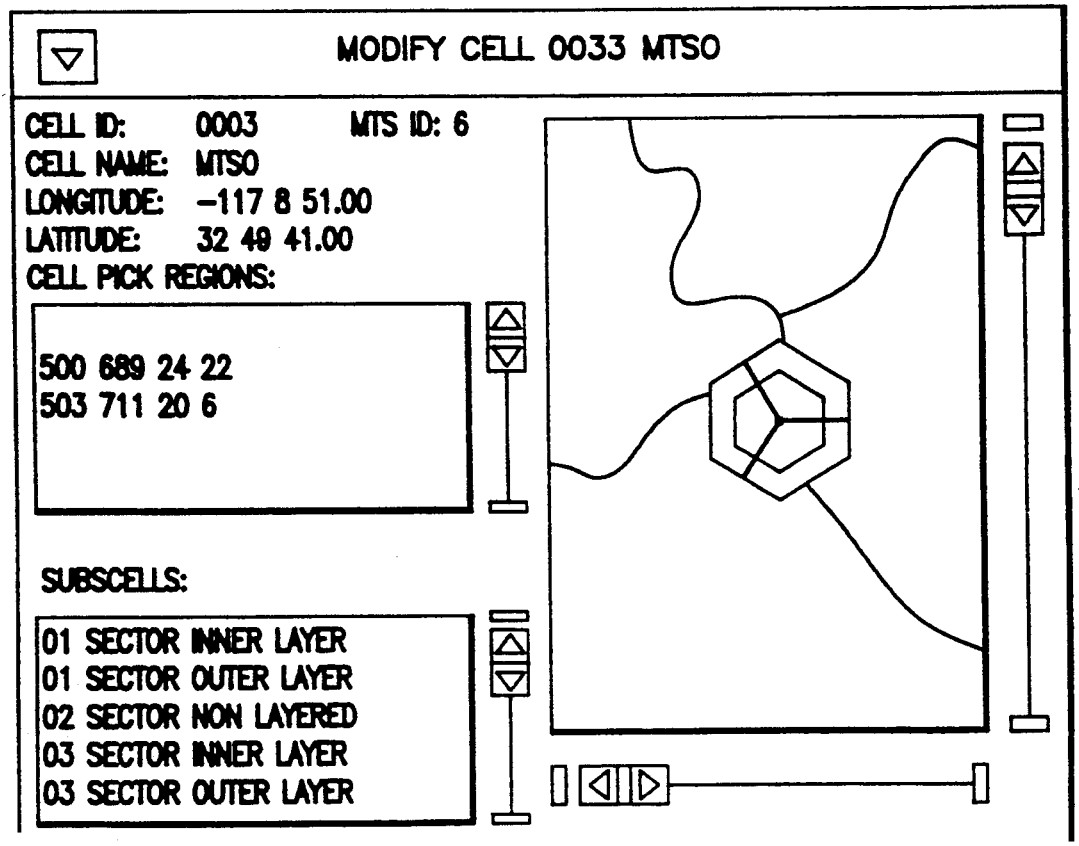
FIG. 13 is a screen display for data entry fields and a graphical view port in accordance with the principals of the present invention.

An exemplary, but not exclusive, screen display for step 282 is depicted in FIG. 13. The data entry fields include, inter alia, an identification number for a cell, a MTS ID to identify the MTS under which current cell sites are attached, cell name, longitude, latitude, cell pick regions which describe the "graphical attributes" of particular cells, and subcells.

The pick regions entered when creating that cell enable the user to identify the cell and provide default information for that cell. Every cell can have up to twelve subcells (sectors), each of which will have its own ID number and section and spectrum type description.

At step 284, the user may add, modify or delete a pick region once a desired cell/sector has been selected. At step 286, the change section direction option allows the user to change longitude, latitude, direction, span, range, and spectrum of a given sector. The section direction is determined by a vector originating from the center of the cell to a rotation indicator. The user may modify the cell boundary by moving a target to a first boundary point and anchoring it. The user then moves the target to subsequent points and marks each apex of the cell until all points are defined.

The cell add option at step 262 enables the user to create new cell sites. By default, a new cell site is attached to the current MTS. If more than one MTS exists, the user must select the MTS under which they want to locate the new cell. At steps 288–292, the user can input necessary entry data, select the pick regions, and set up cell and subcell(s) boundaries in the new cell site.

The cell remove option at step 264 deletes a cell site from both the CSM Map and the System Map. The user selects the cell to be deleted at step 294 and deletes the cell at step 296.

In those cellular markets where there are more than one MTS, it is necessary to select the MTS under which the user wants to modify or create a cell site model. The MTS select option at step 266 allows the user to do so.

The MTS modify option at step 268 allows the user to add or delete cells from an existing TTS. When the user selects a MTS modify option, statistics and a listing of all cells within the selected MTS appears at step 298. At step 300, the user can input the appropriate information into the data entry fields.

The MTS add new option at step 270 allows the user to create a new MTS. At step 302 the user moves a pointer to a desired location. At step 304 the user enters the newly created MTS and makes "current" the MTS for all subsequent new cell sites until another MTS has been selected.

The MTS Remove option at step 272 allows the user to delete the MTS from the view port and the CSM Map.

The Save step 274 saves changes and new information in a current model to a system model file at step 305.

The Save as step 276 is similar to the Save step 274, but allows the user to save the current model to a file other than the system model file at step 305. After selecting the Save as step 276, a dialog box will appear requesting the name of the file. The user then enters the name of the file to be saved at step 306.

The Load from step 278 allows the System to load the cell site model from the system model file when the cell site model option is selected. The user is queried to name the file to be loaded at step 308. This allows the user to modify a cell site from a "personal" file at step 310 and display the data at step 312. The changes therein would not impact the default system model file until such time as the user is ready to save to that file.

Trouble Ticketing

The trouble ticketing module 137 utilizes data entry to allow operations staff and field technicians, collectively referred to hereinafter as the "user", to review, record and repair system problems and to monitor problem resolution. The trouble ticketing module 137 also generates periodic and ad hoc management reports to reflect the performance of the network and the time required to repair each type of failure. The four main functions of the Trouble Ticketing system are as follows:

Query Database: For reviewing, closing and editing existing tickets. Typically, a user starting a new shift will review the activity which occurred in the previous shift. The query function is oriented and optimized to support this style of database access and not general purpose inquiries. The Query Database option allows the user to select and sort tickets for subsequent review and or update operations.

New Trouble Tickets: For adding new tickets to the trouble ticketing database.

New Network Event: For adding new network events to the trouble ticketing database.

Generate Reports: For creating standard reports.

Figure 14:
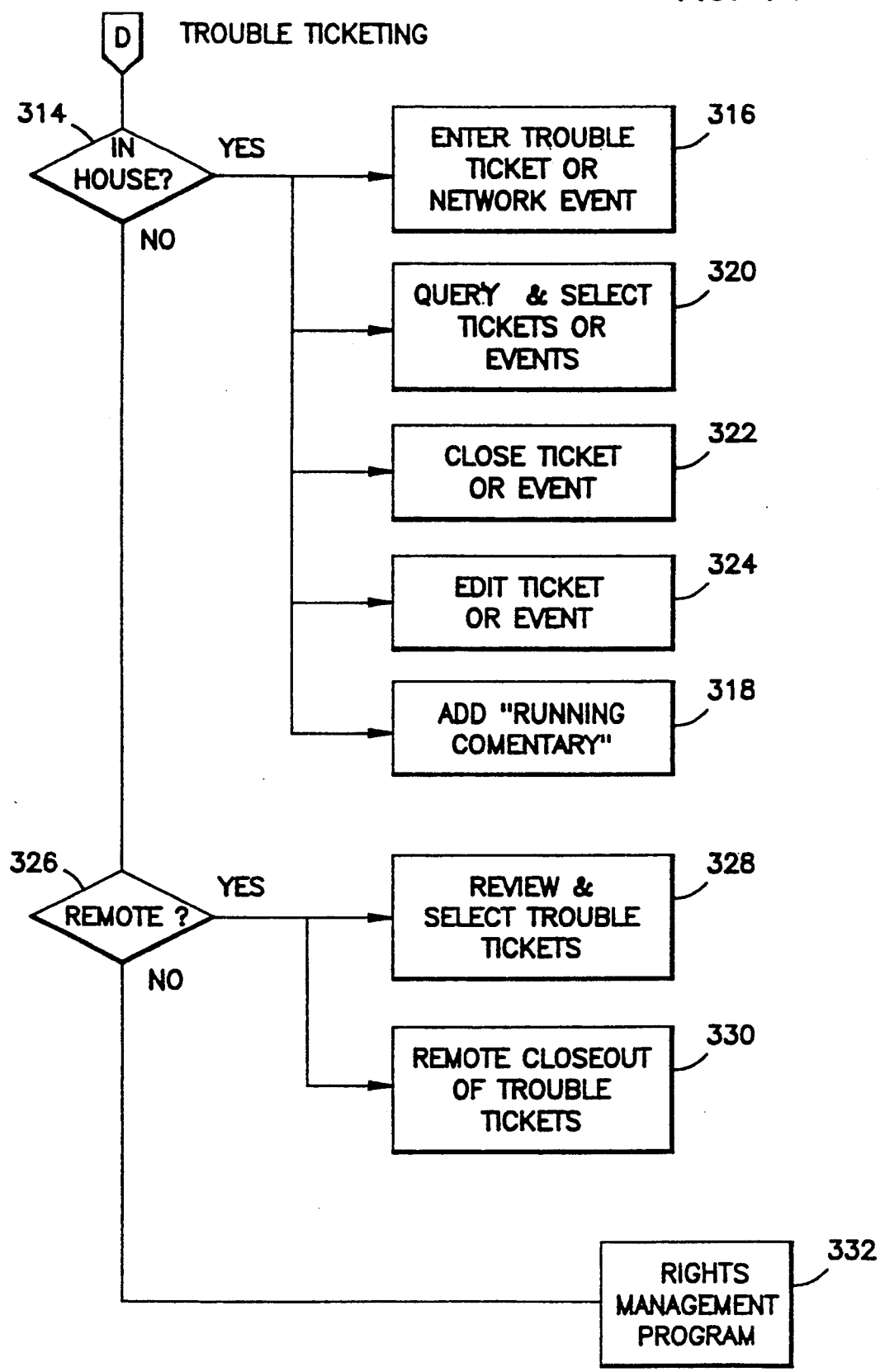
FIG. 14 is a detailed flow diagram of the trouble ticketing module in FIG. 2.
Figure 15:
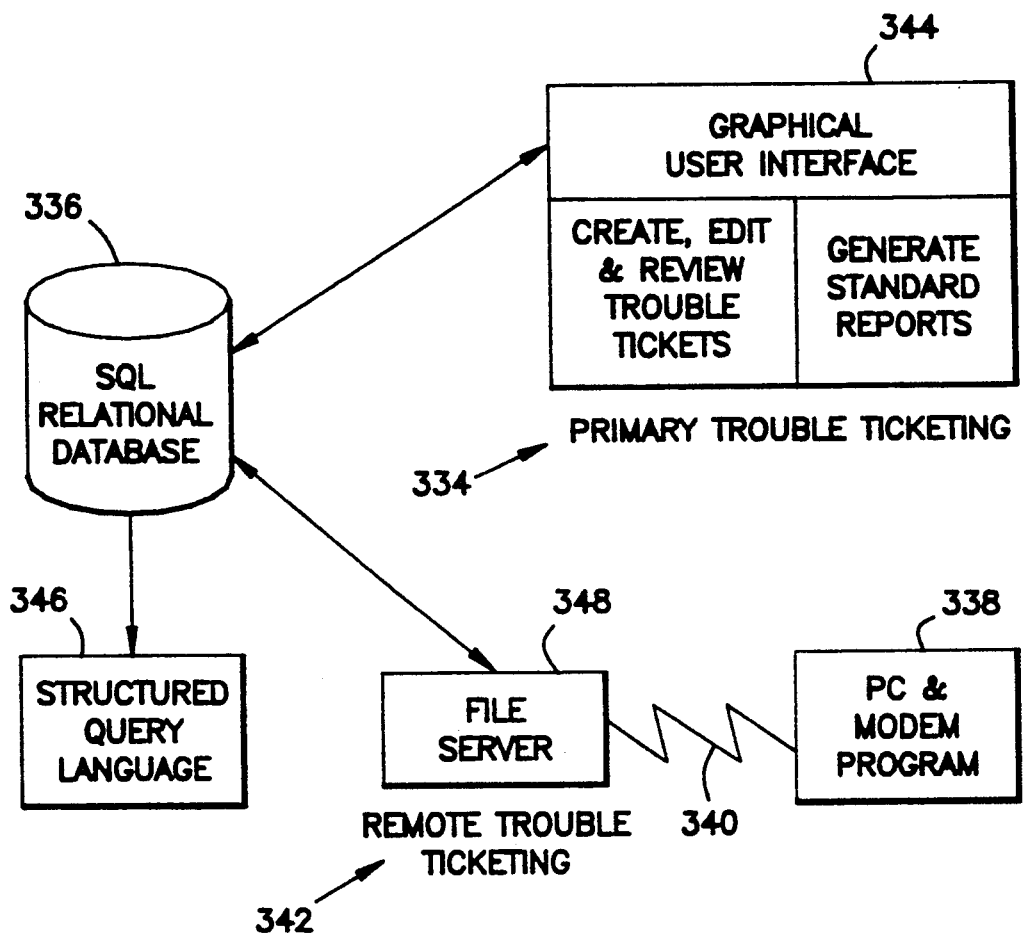
FIG. 15 is a block diagram of remote and primary trouble ticketing in accordance with the principals of the present invention.

Reference is now made to FIGS. 14 and 15 which depict a detailed flow diagram of the trouble ticketing module 137 in FIG. 2 and a block diagram of remote and primary ticketing respectively. When a network problem is identified in-house at step 314 (i.e. primary trouble ticketing 334 in FIG. 15), the user can create either a new trouble ticket or a new network event at step 316 by entering the affected location and problem description. The trouble tickets are automatically assigned to a particular work group through a work group assignment. The ticket or event is marked as "open" and is automatically stamped with the current date and time. The entry operator (user) may also add a free format commentary to any trouble ticket or network event at step 318. The commentary allows a write-only log of free form text comments entered by the operator. It also automatically logs any edit operations made on a given ticket or event. These running commentary entries are not editable as they provide a file of non-standard changes made to a ticket or event.

At step 320, the user can review or browse existing trouble tickets or network events by using user-defined selection and sorting criteria. They may also close (step 322) or make corrections (step 324) to existing tickets or events if necessary.

At step 326 technicians in the field, using a portable computer (PC) with a dial up modem 338 can access over the phone line 340 the "open" trouble tickets but not network events. At steps 328 and 332, a screen oriented driver program assists the technicians in finding their highest priority assignment. When they have corrected the problem, the same program marks the trouble ticket as "closed" and automatically updates both the trouble ticket database and the assignment list.

The Trouble Ticketing System can be divided into three parts, namely, primary trouble ticketing 334, remote trouble ticketing 342, and rights management 332.

Rights Management

The rights management program 332 assigns, reviews and revoke access rights to the database 336 on a per user basis. A System Administrator (supervisory user) has controlled access to the rights management program.

Remote Trouble Ticketing

Remote trouble ticketing is provided for remote field users to access trouble ticketing through a PC and program 338 which communicates over a dial-up telephone line 340 using standard modems and a versatile virtual terminal driver. Files are served between the remote user and a Structured Query Language (SQL) relational database 346 by file server 348. Structured Query Language 346 allows the user to query the database in a simple language. Included in the remote trouble ticketing, but not as a limitation, is a provision for a field user to review open tickets and to select individual tickets for expanded information on a particular problem. Upon completion of repair, the user may remotely close a given ticket. Trouble ticket review and close out is performed using a virtual terminal driver that resides on the master server 100 (FIG. 1).

The remote user runs a "generic" screen utilizing a screen oriented character display driver taking advantage of line drawing abilities. User interaction and screen updates are handled by the master server 100 and not within the remote portable computer. The technician places a call to the master server 100 using a generic modem program, such as, but not limited to, Pro-Comm ® from Datastorm Technologies, Inc, of Columbia Missouri. Remote Trouble Ticketing is then invoked through the modem program and a menu of available functions is listed. Typically, a Trouble Ticket Review/Update or "selection" function will be displayed. If so, the database will have been queried for "open" tickets assigned to this person. A summary list of all such tickets is then displayed on the PC screen. If they won't all fit, the arrow-down and arrow-up keys can be used to scroll through the entire list.

A new ticket can be selected by first using the down-arrow and up-arrow keys to highlight the list item then using a function key to select and display the ticket. The newly selected ticket will be shown in detail on the screen.

When the field technician has corrected the equipment problem, the "close ticket" function key is selected. When finished filling in the close out fields, the technician selects a function key to confirm the close-out.

The technician back-end runs on-demand on the master server 100 workstation. The process is started only after a call is received and a technician log-in succeeds. This process provides a built-in security mechanism by requiring the technician to "log in," giving a user name and password. Additional security is provided at the database level using a predetermined program. The program replaces the command interpreter for that user's session. This completely insulates the technician from any interaction with the underlying operating system. Another benefit of this technique is that if the back-end program fails, the session automatically terminates and the call is disconnected.

Primary Trouble Ticketing

The user has multiple options with primary trouble ticketing. They may select a specific trouble ticket under the basis of the statuses "open, opened, closed, opened or closed, or open, opened or closed". As an example, predefined ranges such as "during the last 2 hours" to "during the last 72 hours" maybe used. Those skilled in the art will be able to bring to mind other suitable ranges for which the principles of the present invention may be practiced.

A specific trouble ticket may be selected under the basis of the following criteria:
All Ticket Types
Channel Out
Chronic
Unsatisfactory Condition
Immediate Action A ticket location maybe selected under the following criteria:
All Ticket Types
Cell Site Ticket Group
Work Group
Without Assigned Work Group
Tickets maybe sorted by the following primary criteria:
Time Opened
Cell Site
Ticket Type
Work Group
Ticket Group
Duration
Tickets maybe sorted by the following sort tickets by the following secondary criteria:
Time Opened
Cell Site
Ticket Type
Work Group
Ticket Group
Duration
N/A Since the primary and secondary ticket sorting are based on the same criteria, the secondary selection should not be allowed to match the primary selection.

The user may also browse to review tickets and invoke any desired closeout or edit operations. The user may view any optional extended comments which may have been logged.

Query by "Network Events"

The previous sections hereinabove described query by Trouble Tickets. Query by Network Events has options that are substantially the same as those discussed in the "Trouble Ticket" with the following exceptions.

A search duration field enables the user to enter a predefined or manual time range. The select event type selection offers the following options:
All Event Types
Unscheduled Network Events
Scheduled Network Events
Event Location such as All or Cell Site The user can use the query by "Select a Ticket" if the ticket group, ticket date and the ticket number are known. The user can quickly enter new corrections to this ticket.

The user may use the query by "Select an Event" if the event date and number are known. The user can quickly enter new corrections to this event.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for managing and integrating data in a cellular telephone network comprising:
   (a) a computer network including means for collecting real-time data and near real-time data from a plurality of telephone network elements, master server means for receiving and formatting the data, slave server means coupled to the master server means for parsing and reformatting the data;
   (b) a plurality of modular task handlers running on the computer network for application by at least one user, the plurality of modular task handlers being easily integrated with future application programs, the modular task handlers including,
      (i) means for processing the data,
      (ii) on-line relational data base means for storing the data,
      (iii) means for managing equipment inventory in response to the processing of the data,
      (iv) means for providing customer service in response to the processing of the data,
      (v) means for providing tactical surveillance in response to the processing of the data,
      (vi) means for providing trend forecasting in response to the processing of the data,
      (vii) means for modeling cell sites in response to the processing of the data; and
   (c) a plurality of user workstations coupled together and to the master server means and slave server means through the computer network, for providing user access to the plurality of modular task handlers.

2. A system as recited in claim 1 further comprising a graphical user interface for facilitating ease in report generation and system management.

3. A system as recited in claim 1 wherein the telephone network elements comprise telephone switches, cellular sites, microwave equipment, environmental alarm systems and digital cross-connect systems.

4. A system as recited in claim 1 wherein the workstations operate in a multi-tasking window based environment.

5. A cellular telephone network support system for managing and integrating data from telephone switches, cellular phone sites and other related elements, the system comprising:
   (a) a relational database having data for providing tactical surveillance, prediction and simulation, and network management;
   (b) a workstation configured as a master server for collecting and filtering incoming data from a plurality of network elements, the data representative of billing, traffic alarm, administration, and maintenance information, the master server further preparing updates for the relational database;
   (c) a workstation configured as a slave server and coupled to the master server through a computer network, for supplying the relational database with data received from the master server and for storing historical files and providing work-space for recovery and analysis of said historical files; and
   (d) a plurality of user workstations, coupled together with the master and slave server through the computer network, the slave server processing database access requests from any of the plurality of user workstations.

6. A network support system as recited in claim 5 wherein the network elements comprise a digital access cross-connect system, a mobile telephone switch, and external alarms.

7. A network support system as recited in claim 5 wherein the master server further comprises a modem for providing dial-up access to the network.

8. A network support system as recited in claim 5 wherein the network has a ring topology.

9. A network support system as recited in claim 5 wherein the network has a star topology.

10. A network support system as recited in claim 5 wherein the network has a bus topology.

11. A network support system as recited in claim 5 wherein the slave server serves as an user workstation during non-peak usage periods.

12. A network support system as recited in claim 5 wherein the tactical surveillance database enables a user to evaluate alarm data from the network elements affected by a disaster and enables a privileged user to make dynamic network adjustments in response thereto.

13. A network support system as recited in claim 12 wherein the disaster is a cell site outage.

14. A network support system as recited in claim 12 wherein the disaster is an unusual shift in traffic patterns.

15. A network support system as recited in claim 5 wherein the network management database further comprises means for traffic forecasting wherein a user inputs a starting date from which to initiate sourcing of historical data and a future date for which it is desired to forecast, and wherein the user inputs a blocking probability percentage wherein a theoretical percentage of the number of trunks that will be blocked at a given time is provided.

16. A network support system as recited in claim 5 wherein the network management database further comprises:
 (i) means for generating operational, performance, and maintenance system reports;
 (ii) means for creating trend forecasts and cell site modeling of existing cellular phone markets; and
 (iii) a graphical user interface for use with the means for generating operational, performance, and maintenance system reports and the means for creating trend forecasts and cell site modeling of existing cellular phone markets, the interface providing access to a system map window, a reports window, a cell site modeling window, a trouble ticketing window, and a system configuration window.

17. A network support system as recited in claim 16 wherein the system configuration window further comprises:
 means for configuring a reporting format for standard reports;
 means for inputting a total days of a month and days of a week from which data will be sourced to generate the reports;
 means for inputting exceptions that will not be included in routine reporting;
 means for inputting a specific market name; and
 means for inputting a busy hour to choose the busy hour and to default to a value set by a System Administrator in absence thereof.

18. A method for providing support in a cellular telephone network, comprising the steps of:
 (a) collecting real-time data and near real-time data from a plurality of telephone network elements;
 (b) receiving and formatting the data on a master server connected to the computer network;
 (c) parsing and reformatting the data on a slave server coupled to the master server; and
 (d) processing the data on the computer network, including the steps of:
  (i) managing equipment inventory on the computer network in response to the processing of the data,
  (ii) providing customer service on the computer network in response to the processing of the data,
  (iii) providing tactical surveillance on the computer network in response to the processing of the data,
  (iv) providing trend forecasting on the computer network in response to the processing of the data, and
  (v) modeling cell sites on the computer network in response to the processing of the data, wherein the modelling step further comprises the steps of providing data for an existing cell/sector spectrum configuration for system administration utility modeling, supplying auxiliary cell site models to a system administrator, and supplying a default cell site model for use by an user.

19. A method as recited in claim 18 further comprising the step of providing a graphical user interface for facilitating ease in report generation and system management.

20. A method as recited in claim 18 further comprising the step of providing a multi-tasking window based environment.

* * * * *

UNITED STATES PATENT AND TRADEMARK OFFICE
CERTIFICATE OF CORRECTION

PATENT NO. : 5,285,494
DATED : February 8, 1994
INVENTOR(S) : Jerry W. Sprecher et al.

It is certified that error appears in the above-identified patent and that said Letters Patent is hereby corrected as shown below:

```
Col. 3, Line 64:   Insert --to-- after the word "not".
Col. 4, Line 58:   Insert --of-- after the word "scope".
Col. 5, Line 36:   "process" should read --processed--.
Col. 5, Line 49:   "of all" should read --all of--.
Col. 6, Line 10:   "180" should read --182--.
Col. 7, Line 61:   "base" should read --based--.
Col. 8, Line 26:   "president" should read --president's--.
Col. 10, Line 24:  "TTS" should read --MTS--.
Col. 11, Line 6:   "and or" should read --and/or--.
```

Signed and Sealed this

Thirteenth Day of September, 1994

Attest:

BRUCE LEHMAN

*Attesting Officer*          *Commissioner of Patents and Trademarks*